(12) United States Patent
Holland et al.

(10) Patent No.: US 10,713,748 B2
(45) Date of Patent: Jul. 14, 2020

(54) DISPLAY PIPELINE MEMORY BANDWIDTH ALLOCATION SYSTEMS AND METHODS

(71) Applicant: Apple Inc., Cupertino, CA (US)

(72) Inventors: Peter F. Holland, Los Gatos, CA (US); Mahesh B. Chappalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 16/122,473

(22) Filed: Sep. 5, 2018

(65) Prior Publication Data
US 2020/0074583 A1   Mar. 5, 2020

(51) Int. Cl.
  G06T 1/20      (2006.01)
  G06T 1/60      (2006.01)
  G06F 12/1081   (2016.01)
  G06F 13/28     (2006.01)

(52) U.S. Cl.
  CPC ............ G06T 1/20 (2013.01); G06F 12/1081 (2013.01); G06F 13/28 (2013.01); G06T 1/60 (2013.01)

(58) Field of Classification Search
  CPC ......... G06T 1/20; G06T 1/60; G06F 12/1081; G06F 13/28

USPC .................................................. 345/506, 530
See application file for complete search history.

(56) References Cited

U.S. PATENT DOCUMENTS

| | | |
|---|---|---|
| 2016/0284040 A1 | 9/2016 | Rengarajan et al. |
| 2016/0284046 A1 | 9/2016 | Koker et al. |
| 2017/0039932 A1* | 2/2017 | Staudenmaier ...... G09G 3/2096 |
| 2017/0345122 A1 | 11/2017 | Seiler et al. |
| 2017/0372675 A1* | 12/2017 | Cho ....................... G09G 5/005 |

* cited by examiner

Primary Examiner — Jacinta M Crawford
(74) Attorney, Agent, or Firm — Fletcher Yoder, P.C.

(57) ABSTRACT

Display pipeline may manage allocation of total memory bandwidth to memory access requester blocks (e.g., display pipeline as a whole and/or a block in the display pipeline) by dynamically allocating the total memory bandwidth based at least in part on a calculated bandwidth floor to reduce the communication inefficiency (e.g., underruns), excessive power consumption, and image quality degradation of the display pipeline. Image fetch parameters, electronic display parameters, display pipeline parameters, and memory access requester block parameters may be used to determine the appropriate bandwidth floor for each memory access requester of the display pipeline. Additional memory bandwidth may be allocated to memory access requesters of the display pipeline when available bandwidth remains to further reduce likelihood of subsequent communication inefficiencies in the display pipeline.

19 Claims, 9 Drawing Sheets

DISPLAY PIPELINE MEMORY BANDWIDTH ALLOCATION SYSTEMS AND METHODS

BACKGROUND

The present disclosure relates generally to electronic displays and, more particularly, to managing (e.g., allocating) memory bandwidth used to communicate image data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information (e.g., text, still images, or video) based on corresponding image data. For example, such electronic devices may include computers, mobile phones, portable media devices, virtual-reality headsets, and vehicle dashboards, among many others. In any case, to display an image, an electronic display may control light emission (e.g., luminance) of its display pixels based at least in part on corresponding image data. To facilitate improving perceived image quality, in some instances, an electronic device may include a display pipeline (e.g., image data processing circuitry) that processes image data before an electronic display uses the image data to display a corresponding image (e.g., image frame).

In some instances, image data may be stored in memory, for example, along with other types of data, such as configuration data, which may be used to program the display pipeline, and/or statistics data, which may be indicative of image content and, thus, evaluated by the display pipeline. As such, during operation, various components of the electronic device, such as the display pipeline, may access the memory, for example, via direct memory access (DMA) to retrieve (e.g., read or fetch) data for processing. In some instances, amount of data requested by a component may dynamically vary, for example, when the component is a real-time client that responds to user interaction and/or environmental conditions. However, total memory access bandwidth provided by an electronic device is often fixed, which, at least in some instances, may limit data access speed (e.g., rate) provided to one or more of the memory access requesters and, thus, operational efficiency.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving power consumption and/or operational efficiency of electronic devices implemented with multiple memory access requesters including a display pipeline, for example, that processes image data before the image data is used to display a corresponding image on an electronic display. In some embodiments, image data may be stored in memory external from the display pipeline. Thus, in such embodiments, the display pipeline may fetch (e.g., read or retrieve) the image data from the external memory, for example, via direct memory access (DMA) prior to processing.

In addition to image data, the external memory may store other data, such as configuration data that may be used to program (e.g., adjust or configure) operation of the display pipeline. As such, the display pipeline may fetch the other data from the external memory, for example, via direct memory access (DMA) block. In fact, in some embodiments, the other data may be fetched from the external memory at approximately the same time as image data, for example, when the other data is used by a real-time client that responds to user interaction (e.g., user touch) and/or environmental conditions (e.g., temperature determined via sensors), such as image data processing circuitry that varies tone mapping applied to image data based at least in part on ambient lighting conditions. Moreover, since it responds to user interaction and/or environmental conditions, in some embodiments, amount (e.g., size) of data used by a real-time client may vary during operation.

However, total bandwidth available for accessing the external memory is generally fixed and, thus, may be allocated (e.g., divided) between each memory access requester. For example, the total memory access bandwidth may be allocated between a fetch block, which requests image data to be input to the display pipeline, and one or more image data processing block(s), which request other data stored in the external memory. In some embodiments, retrieval rate of requested data may affect operational efficiency of the memory access requester and/or resulting perceived image quality. For example, when memory access bandwidth allocated to the fetch block and/or a subsequent image data processing block(s) is insufficient, the display pipeline may experience an underrun condition, during which the display pipeline pauses operation and/or an electronic display repeats (e.g., reuses) previously received image data.

Accordingly, the present disclosure provides techniques for adaptively (e.g., dynamically) allocating total memory access bandwidth implemented in an electronic device, for example, to facilitate improving operational efficiency of a display pipeline implemented in the electronic device and/or perceived image quality resulting from display of an image based on image data output from the display pipeline. In some embodiments, the total memory access bandwidth may be allocated based at least in part on a bandwidth floor associated with each memory access requester, such as a fetch block and/or image data processing block(s) implemented in the display pipeline. For example, a bandwidth floor associated with the fetch block may be determined based at least in part on source format of image data, memory format used to store the image data, whether the image data is rotated, dimensions (e.g., width and/or height) of a source image, dimensions (e.g., width and/or height) of a display panel coupled to the display pipeline, line time of the display panel, or any combination thereof. Additionally or alternatively, a bandwidth floor associated with a memory access requester, such as an image data processing block implemented in the display pipeline, may be determined based at least in part on other parameters.

In some instances, the display pipeline may include an image processing circuitry that is allocated a portion of the total memory bandwidth based on a calculated bandwidth floor. For example, in addition to the panel dimensions and the panel line time, a bandwidth floor associated with a sub-pixel uniformity compensation (SPUC) block may be determined based at least in part on sub-sampling ratio and/or number of bits used to indicate offsets to be applied by the sub-pixel uniformity compensation (SPUC) block. Similarly, in addition to the panel dimensions and the panel line time, a bandwidth floor associated with a burn-in compensation (BIC) block may be determined based at least in part on sub-sampling ratio and/or number of bits used to indicate gains to be applied by the burn-in compensation (BIC) block. Furthermore, in addition to the panel dimensions (e.g., height) and the panel line time, a bandwidth floor associated with a burn-in statistics (BIS) block may be determined based at least in part on dimensions (e.g., width) of an active region and/or number of bits used to indicate a luminance history determined based at least in part on analysis of the active region.

Moreover, in some embodiments, one or more of the memory access requesters implemented in the electronic device may vary operation and, thus, requested data. In some embodiments, such a memory access requester may be a real-time client that varies (e.g., adapts or adjusts) operation based on user interaction with the electronic device and/or environmental (e.g., ambient lighting and/or temperature) conditions. For example, the display pipeline implemented in the electronic device may include an image data processing block that applies different tone maps to image data based at least in part on ambient lighting conditions, which, at least in some instances, may change suddenly.

To facilitate improving operational efficiency and/or resulting perceived image quality, in some embodiments, the total memory access bandwidth may be allocated such that each memory access requester is allocated bandwidth of at least its bandwidth floor, which may be determined by operational and real-time parameters. In some instances, the total memory access bandwidth may be greater than a sum of the bandwidth floors associated with each memory access requester. To facilitate improving subsequent operation, in such instances, the remaining memory access bandwidth may be opportunistically allocated to the memory access requesters, thereby increasing memory access bandwidth allocated to one or more of the memory access requesters above its bandwidth floor. For example, increasing memory access bandwidth allocated to the fetch block above its bandwidth floor may result in more image data being fetched, which, at least in some instances, may facilitate reducing likelihood that an underrun condition occurs in the display pipeline during subsequent operation.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
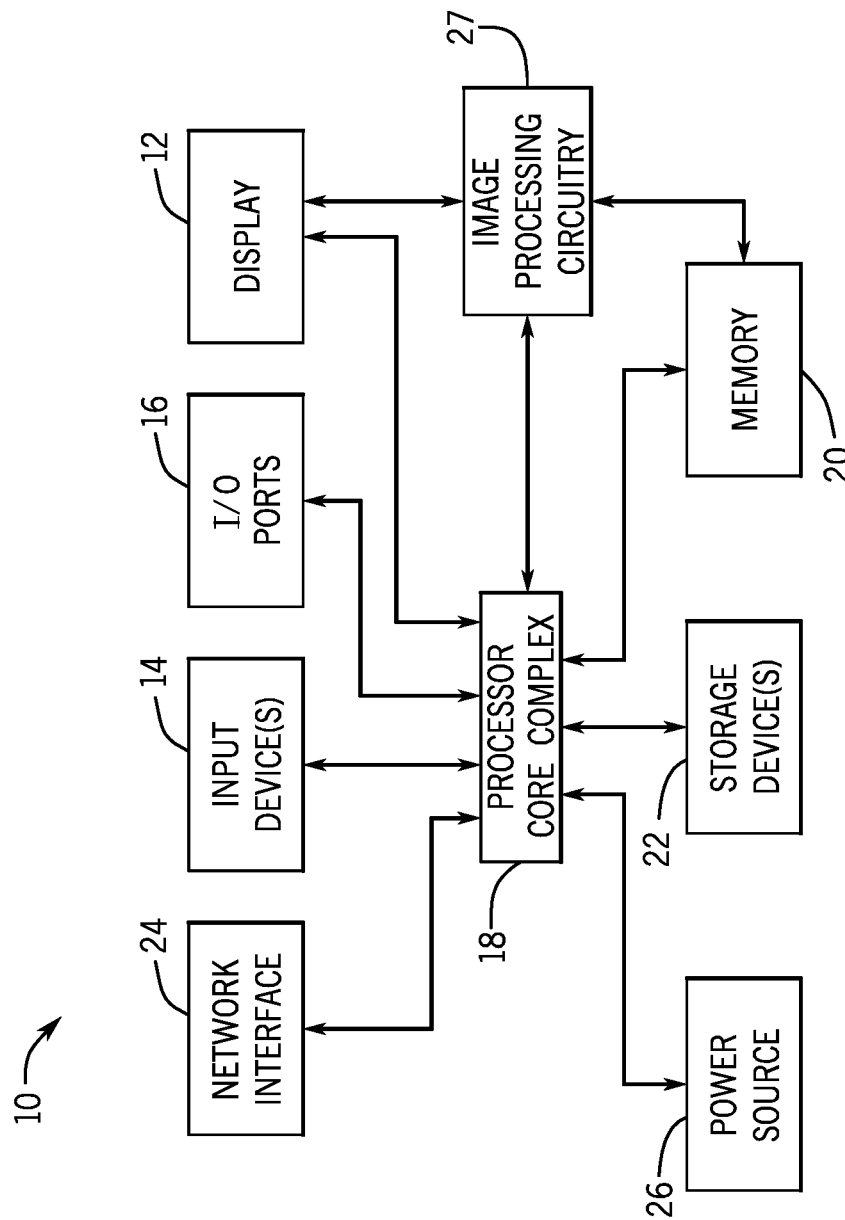
FIG. 1 is a block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, an electronic device may include a display pipeline, which receives image data stored in external memory, processes the image data before the image data is used to display a corresponding image on an electronic display, and/or outputs data for storage in the external memory, for example, to facilitate processing of subsequent image data. To facilitate improving operational efficiency, a display pipeline may be implemented to directly access the external memory, for example, via a direct memory access (DMA) block. In some embodiments, a display pipeline may include one or more memory access requesters that each requests access to the external memory for data retrieval and/or data storage. For example, the display pipeline may include a fetch block that requests the direct memory access (DMA) block to retrieve (e.g., fetch) image data from the external memory for processing via one or more downstream image data processing block(s) implemented in the display pipeline.

The display pipeline may also include one or more memory access requesters (e.g., image data processing) that request the direct memory access (DMA) block to retrieve other data to be used during processing of the image data. For example, the display pipeline may include a sub-pixel uniformity compensation (SPUC) block that applies offsets to image data based on an offset map, which is sub-sampled (e.g., down-sampled) and/or stored in the external memory. Additionally or alternatively, the display pipeline may include a burn-in compensation (BIC) block that applies gains to image data based on a gain map, which is sub-sampled (e.g., down-sampled) and stored in the external memory. As such, in some embodiments, the direct memory access (DMA) block may access the external memory to fetch (e.g., retrieve or read) offset map data, gain map data, and/or the like into the display pipeline.

Additionally or alternatively, the display pipeline may include one or more memory access requesters (e.g., image data processing) that request the direct memory access (DMA) block to store data determined based at least in part on processing (e.g., analysis) of the image data. For example, the display pipeline may include a burn-in statistics (BIS) block that analyzes image data corresponding to an active region to determine statistics, such as a panel luminance update, used to determine the gain map to be applied by the burn-in compensation (BIC) block during subsequent operation. As such, in some embodiments, the direct memory access (DMA) block may access the external memory to store (e.g., write) statistics data from the display pipeline into the external memory.

Moreover, in some embodiments, one or more of the memory access requesters implemented in the electronic device may vary operation and, thus, requested data. In some embodiments, such a memory access requester may be a real-time client that varies (e.g., adapts or adjusts) operation based on user interaction with the electronic device and/or environmental (e.g., ambient lighting and/or temperature) conditions. For example, the display pipeline implemented in the electronic device may include an image data processing block that applies different tone maps to image data based at least in part on ambient lighting conditions, which, at least in some instances, may change suddenly. Thus, to facilitate improving perceived image quality when the image data is used to display a corresponding image, the image data processing block may account for ambient lighting condition changes in real-time or near real-time.

However, total bandwidth available for accessing the external memory (e.g., per DMA cycle) is generally fixed and, thus, may be allocated (e.g., divided) between the memory access requesters. For example, the total memory access bandwidth may be allocated between the fetch block and one or more image data processing block(s) implemented in the display pipeline. In some embodiments, retrieval rate of requested data may affect operational efficiency of the memory access requester and/or resulting perceived image quality.

For example, when memory access bandwidth allocated to the fetch block and/or an image data processing block is insufficient, the display pipeline may experience an underrun condition when a display panel (e.g., driver) requests image data before the display pipeline has completed processing the image data. In some embodiments, a memory access requester may pause (e.g., halt) operation until targeted (e.g., requested) data is completely retrieved from the external memory. For example, when memory access bandwidth allocated is insufficient, the fetch block may wait additional clock cycles before resuming operation, thereby limiting its operational efficiency and, thus, operational efficiency of the display pipeline.

Additionally or alternatively, when memory access bandwidth allocated is insufficient, the image data processing block may operate based on previous data (e.g., statistics, gain maps, and/or offset maps) and/or default values. For example, the sub-pixel uniformity compensation (SPUC) block may apply offsets to image data corresponding with a first display pixel based on an offset map that accounts for non-uniformity in the first display pixel as well as to image data corresponding with a second display pixel. At least in some instances, this may result in actual luminance of the second display pixel differing from its target luminance and, thus, affecting perceived image quality, for example, when the first display pixel and the second display pixel are non-uniform.

During an underrun condition, the display panel may control luminance of its display pixels using previously received image data. For example, the display panel may pause operation (e.g., writing or refreshing) until the framebuffer receives new image data, which, at least in some instances, may be perceivable as a hung image. Additionally or alternatively, the display panel may use image data that indicates target luminance of a first display pixel to control luminance of the first display pixel as well as a second display pixel. At least in some instances, this may result in actual luminance of the second display pixel differing from its target luminance and, thus, affecting perceived image quality, for example, when target luminance of the first display pixel and the second display pixel perceivably differ.

Accordingly, the present disclosure provides techniques for dynamically adjusting allocation of total memory access bandwidth provided by an electronic device, for example, to facilitate improving operational efficiency while accounting for real-time clients. In some embodiments, the total memory access bandwidth may be dynamically allocated based at least in part on a bandwidth floor (e.g., minimum amount of bandwidth guaranteed to be sufficient to prevent underrun) associated with each memory access requester. As described above, a memory access requester implemented in a display pipeline of the electronic device may include a fetch block. In some embodiments, a bandwidth floor associated with the fetch block (e.g., initial image data fetch from external memory into the display pipeline) may be determined based at least in part on source format (e.g., YCbCR or aRGB) of image data, memory format (e.g., linear, 8×8 GPU tile, or 16×8 compressed tile) used to store the image data, whether the image data is rotated, dimensions (e.g., width and/or height) of a source image, dimensions (e.g., width and/or height) of the display panel, line time (e.g., duration for writing a row of display pixels) of the display panel, or any combination thereof.

Additionally, in some embodiments, memory access requester implemented in the display pipeline may include one or more image data processing block(s), such as a sub-pixel uniformity compensation (SPUC) block, a burn-in compensation (BIC) block or sub-block, and/or a burn-in statistics (BIS) block or sub-block. In some embodiments, a bandwidth floor associated with the sub-pixel uniformity compensation (SPUC) block may be determined based at least in part on the dimensions of the display panel, line time of the display panel, number of bits used to indicate offsets to be applied by the sub-pixel uniformity compensation (SPUC) block, and/or sub-sampling ratio to be applied by the sub-pixel uniformity compensation (SPUC) block. Similarly, in some embodiments, a bandwidth floor associated with the burn-in compensation (BIC) block may be determined based at least in part on the dimensions of the display panel, line time of the display panel, number of bits used to indicate gains to be applied by the burn-in compensation (BIC) block, and/or sub-sampling ratio to be applied by the burn-in compensation block. Furthermore, in some embodiments, a bandwidth floor associated with the burn-in statistics (BIS) block may be determined based at least in part on dimensions (e.g., height) of the display panel, line time of the display panel, dimensions (e.g., width) of an active region analyzed by the burn-in statistics block, and/or number of bits used to indicate a luminance history determined by the burn-in statistics (BIS) block based at least in part on analysis of the active region.

To facilitate improving operational efficiency and/or resulting perceived image quality, in some embodiments, the total memory access bandwidth may be allocated such that each memory access requester is allocated at least its bandwidth floor. In some instances, the total memory access bandwidth may be greater than a sum of the bandwidth floors associated with each memory access requester. To facilitate improving subsequent operation, in such instances, the remaining memory access bandwidth may be opportunistically allocated to the memory access requesters, thereby increasing memory access bandwidth allocated to one or more of the memory access requesters above its bandwidth floor. For example, increasing memory access bandwidth allocated to the fetch block above its bandwidth floor may result in more image data being fetched, which, at least in some instances, may facilitate reducing likelihood that an underrun condition occurs in the display pipeline during subsequent operation.

With the foregoing in mind, an electronic device 10, which may utilize an electronic display 12 to display images, is shown in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, memory 20 that may be local to the electronic device 10, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the main memory storage device 22 may be included in a single component. Additionally, the image processing circuitry 27 (e.g., a graphics processing unit (GPU)) may be included in the processor core complex 18.

As depicted, the processor core complex 18 is operably coupled with memory 20 and the main memory storage device 22. In some embodiments, the memory 20 and/or the main memory storage device 22 may be tangible, non-transitory, computer-readable media that stores instructions executable by the processor core complex 18 and/or data to be processed by the processor core complex 18. For example, the memory 20 may include random access memory (RAM) and the main memory storage device 22 may include read only memory (ROM), rewritable non-volatile memory such as flash memory, hard drives, optical discs, and/or the like.

In some embodiments, the processor core complex 18 may execute instructions stored in memory 20 and/or the main memory storage device 22 to perform operations, such as allocating total memory bandwidth to the image processing circuitry 27. As such, the processor core complex 18 may include one or more general purpose microprocessors, one or more application specific processors (ASICs), one or more field programmable logic arrays (FPGAs), or any combination thereof.

Additionally, as depicted, the processor core complex 18 is operably coupled with the network interface 24. Using the network interface 24, the electronic device 10 may communicatively couple to a communication network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network for display on the electronic display 12.

Furthermore, as depicted, the processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output image data to the portable storage device and/or receive image data from the portable storage device.

As depicted, the processor core complex 18 is also operably coupled to the power source 26, which may provide power to the various components in the electronic device 10. The power source 26 may include any suitable source of energy, such as a rechargeable lithium polymer (Li-poly) battery and/or an alternating current (AC) power converter. Furthermore, as depicted, the processor core complex 18 is operably coupled with input devices 14, which may enable a user to interact with the electronic device 10. In some embodiments, the inputs devices 14 may include buttons, keyboards, mice, trackpads, and the like. Additionally or alternatively, the electronic display 12 may include touch components that enable user inputs to the electronic device 10 by detecting occurrence and/or position of an object touching its screen (e.g., outer surface of the electronic display 12).

The electronic display 12 may use, for example, organic light-emitting diode (OLED) or liquid-crystal display (LCD) technology to present visual representations of information by display images, such as on a graphical user interface (GUI) of an operating system, an application interface, a still image, or video content. As described above, the electronic display 12 may display the images based on image data received from memory 20, an external storage device 22, and/or another electronic device 10, for example, via the network interface 24 and/or the I/O ports 16. The electronic display 12 may display the images once the image data has been fetched from memory 20 and processed by the image processing circuitry 27.

Figure 2:
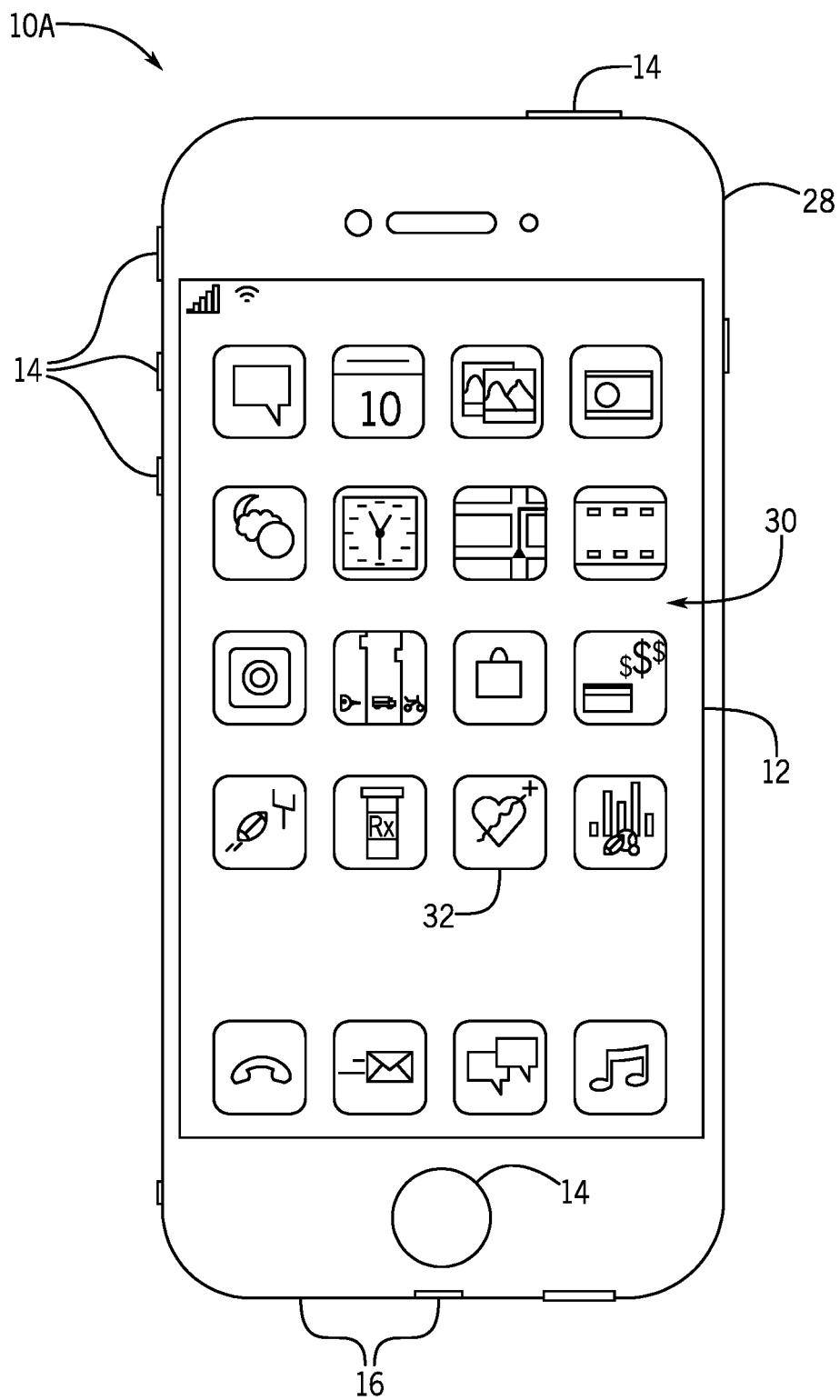
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
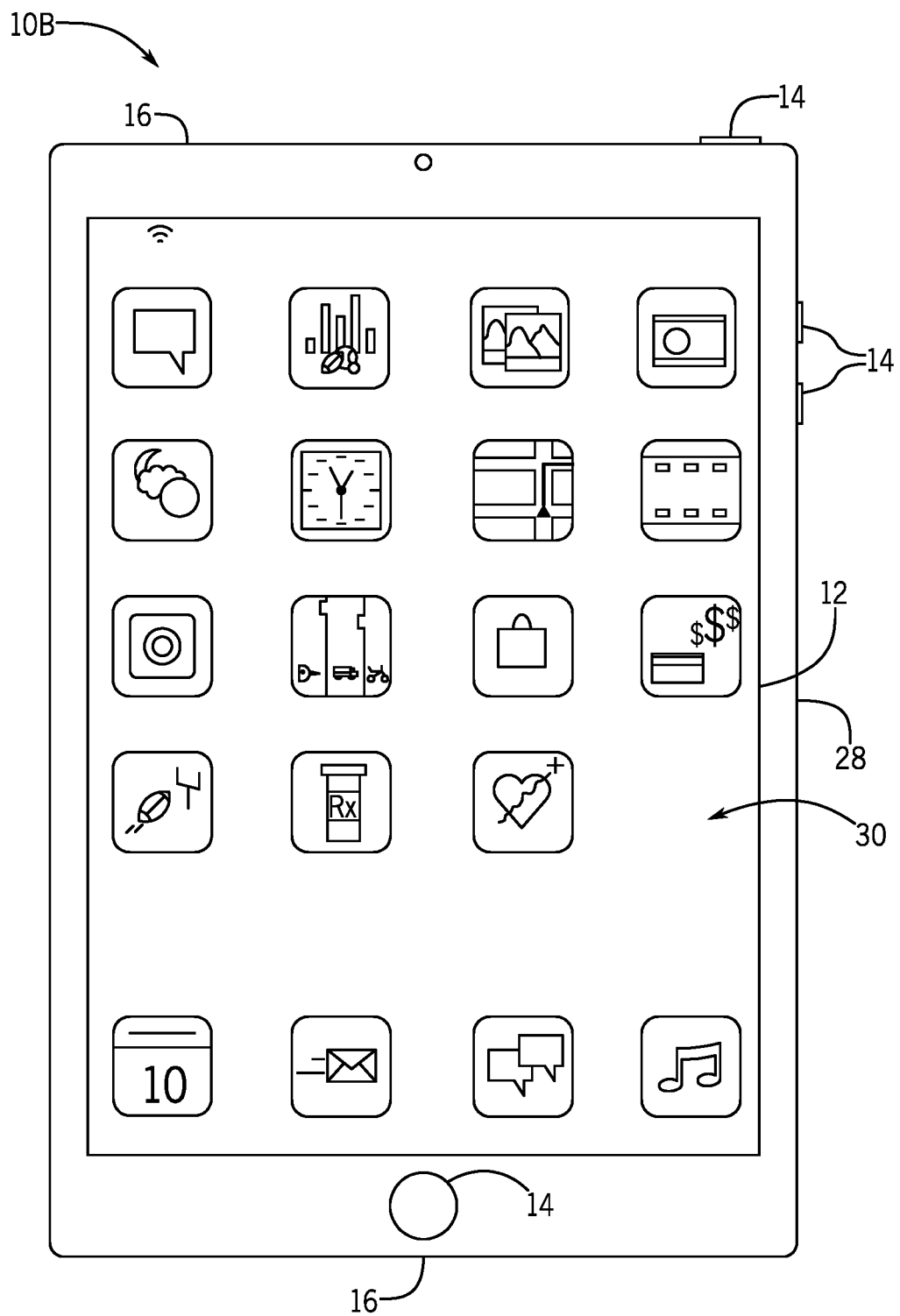
FIG. 3 is another example of the electronic device of FIG. 1, in accordance with an embodiment.
Figure 4:
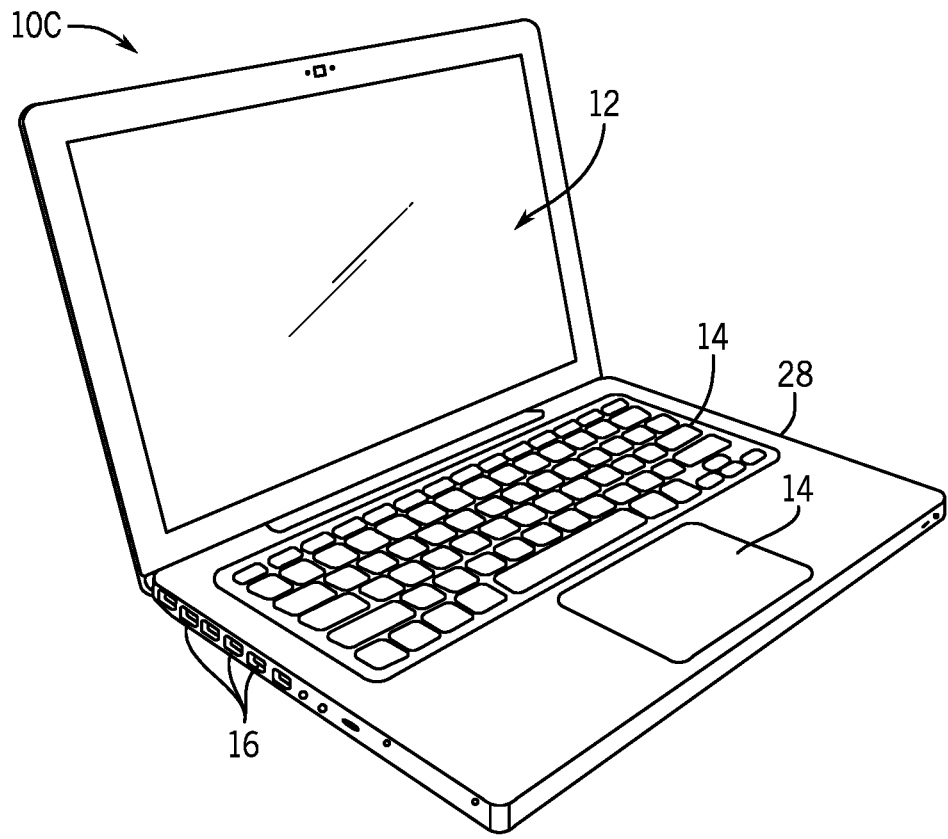
FIG. 4 is another example of the electronic device of FIG. 1, in accordance with an embodiment.
Figure 5:
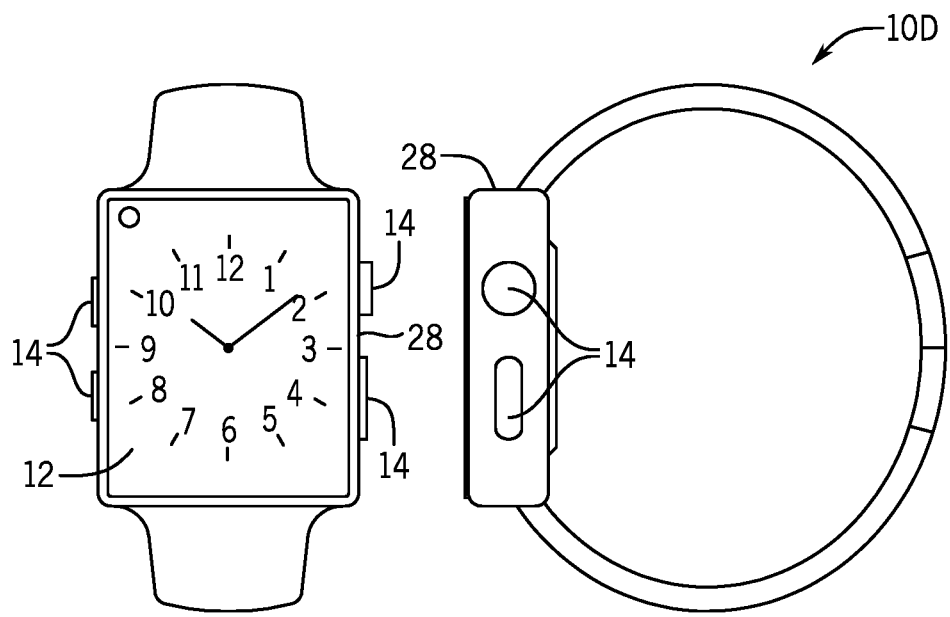
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, an electronic display 12 may display images based at least in part on image data, for example, retrieved from the local memory 20 and/or the main memory storage device 22. Additionally, as described above, image data may be processed before being used to display a corresponding image on the electronic display 12, for example, to facilitate improving perceived image quality. In some embodiments, image data may be fetched and processed by the display pipeline implemented in the electronic device 10.

Figure 6:
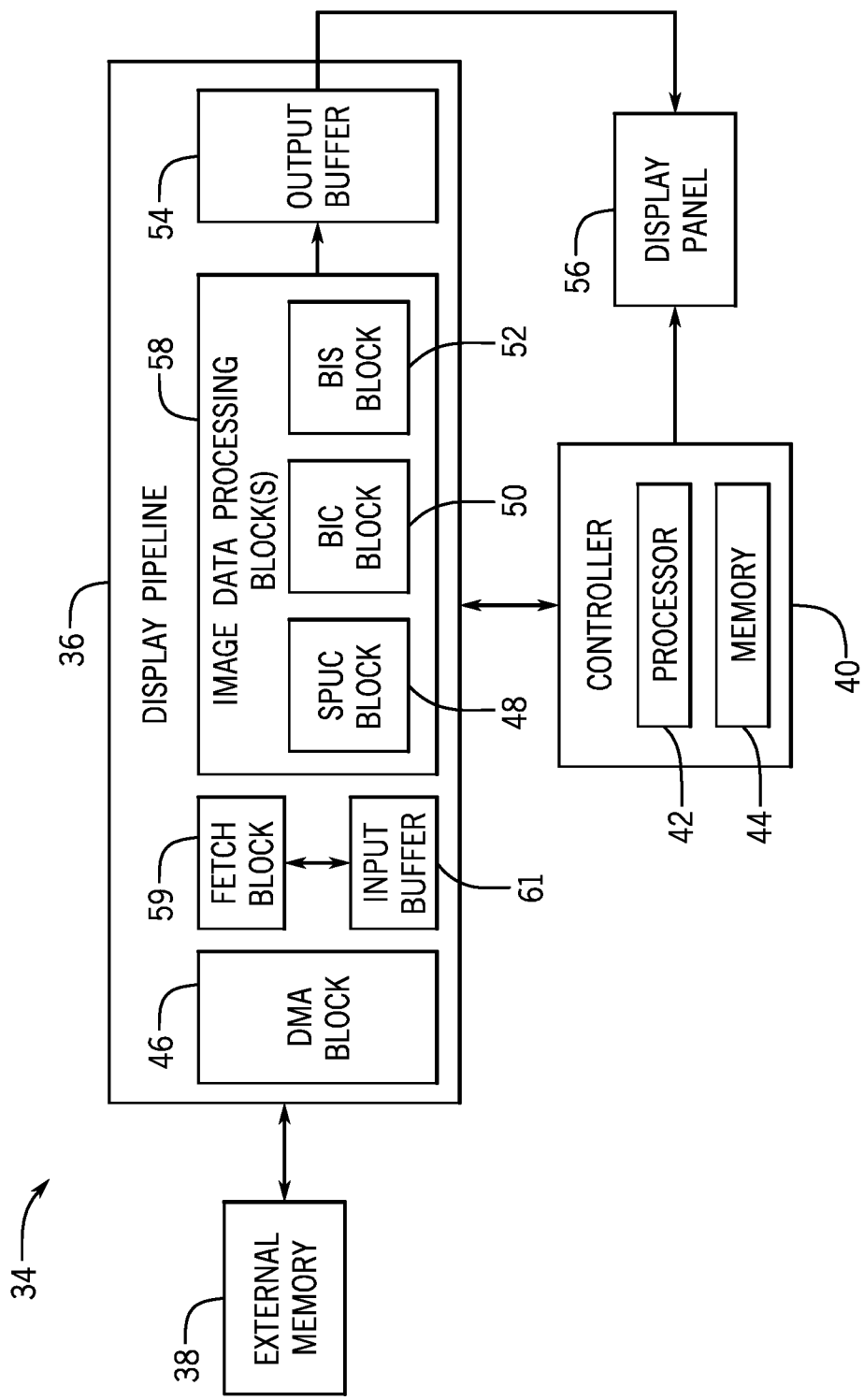
FIG. 6 is a block diagram of a portion of the electronic device of FIG. 1 including a display pipeline with multiple memory access requesters, in accordance with an embodiment.

To help illustrate, a portion 34 of the electronic device 10 including a display pipeline 36 with one or more image data processing blocks 58 is shown in FIG. 6. As depicted, the portion 34 of the electronic device 10 also includes external memory 38 (e.g., memory storage device 22) and a controller 40. In some embodiments, the controller 40 may control operations of the display pipeline 36, the external memory 38, and/or other portions of the electronic device 10.

To facilitate the controlling operation, the controller 40 may include a controller processor 42 and controller memory 44. In some embodiments, the controller processor 42 may execute instructions stored in the controller memory 44. Thus, in some embodiments, the controller processor 42 may be included in the processor core complex 18, the image processing circuitry 27, a timing controller in the electronic display 12, a separate processing module, or any combination thereof. Additionally, in some embodiments, the controller memory 44 may be included in local memory 20, the main memory storage device 22, external memory 38, internal memory of a display pipeline 36, a separate tangible, non-transitory, computer readable medium, or any combination thereof. Although depicted as a single controller 40, in some embodiments, one or more separate controllers 40 may be implemented to control operation of the electronic device.

For example, the electronic device 10 may include a pipeline controller 40 that controls operation of the display pipeline 36 and a supervisory controller 40 that coordinates operation of the display pipeline 36 with one or other sub-systems, such as a touch sensing sub-system, implemented in the electronic device 10. In some embodiments, the supervisory controller 40 may coordinate access to the external memory 38 by allocating memory access bandwidth (e.g., per DMA cycle) between the various sub-systems. As will be described in more detail below, in some embodiments, memory access bandwidth may be allocated based at least in part on bandwidth floors associated with memory access requesters implemented in the various sub-systems. For example, the supervisory controller 40 may allocate the display pipeline 36 a portion of the total memory access bandwidth implemented in the electronic device 10 based at least in part on an image data fetch bandwidth floor, a processing data fetch bandwidth floor, a configuration data fetch bandwidth floor, a statistics data storage bandwidth floor, and/or a combined display pipeline bandwidth floor (e.g., sum of bandwidth floor associated with memory access requester implemented in the display pipeline 36).

In any case, as described above, the display pipeline 36 may operate to process image data retrieved (e.g., fetched) from the external memory 38, for example, based at least on other data retrieved from the external memory 38. In some embodiments, the display pipeline 36 may be implemented via circuitry, for example, packaged as a system-on-chip (SoC). Additionally or alternatively, the display pipeline 36 may be included in the processor core complex 18, the image processing circuitry 27, a timing controller (TCON) in the electronic display 12, other one or more processing units, other processing circuitry, or any combination thereof.

In any case, to simplify discussion, the functions (e.g., operations) performed by the display pipeline 36 are divided between various blocks including a direct memory access (DMA) block 46, a fetch block 59, an input buffer 61, and one or more image data processing block(s) 58 (e.g., circuitry or modules). In particular, the direct memory access (DMA) block 46 may provide the display pipeline 36 access to the external memory 38. For example, the direct memory access (DMA) block 46 may store (e.g., write) data from the display pipeline 36 into the external memory 38. Additionally or alternatively, the direct memory access (DMA) block 46 may retrieve (e.g., read or fetch) image data from external memory 38, for example, based on a request identifying the image data received from the fetch block 59 for subsequent processing via one or more image data processing block(s) 58.

In some instances, the fetch block 59 may request a portion of the total memory access bandwidth when requesting image data to be input to the display pipeline 36. For example, to ensure enough image data is stored within the input buffer 61 such that the display pipeline 36 may operate efficiently, the fetch block 59 may request more image data to be fetched by the direct memory access (DMA) block 46 and thus, may request a greater portion of the total memory access bandwidth.

The input buffer 61 may act as a reservoir to temporarily hold image data requested, for example, by the fetch block 59 and retrieved from external memory 38 via the direct memory access (DMA) block 46. Further, by acting as a reservoir, the input buffer 61 may allow for opportunistic allocation of total memory access bandwidth to the fetch block 59. For example, to reduce likelihood of underrun conditions in the display pipeline 36, the fetch block 59 may be allocated a greater portion of the total memory access bandwidth than the minimum bandwidth originally allotted, thereby enabling the fetch block 59 to retrieve a greater amount of image data. In such instances, the input buffer 61, may hold the additional image data until, for example, downstream image data processing block(s) 58 are ready to process the image data. This may ensure that the display pipeline 36 has retrieved enough image data to prevent underruns.

Additionally or alternatively, in some embodiments, an image data processing block 58 request a portion of the total memory access bandwidth. The one or more image data processing block(s) 58 may process image data to facilitate improving perceived image quality when the display panel 56 uses the image data to display a corresponding image. For example, the sub-pixel uniformity compensation (SPUC) block 48 may process image data to compensate for display pixel (e.g., sub-pixel) non-uniformity that results from manufacturing tolerances of electrical components. At least in some instances, display pixel non-uniformity may affect electrical energy stored in a display pixel and, thus, actual (e.g., perceived) luminance of the display pixel. In fact, display pixel non-uniformity may result in the actual luminance of the display pixel differing from its target luminance indicated by corresponding image data, which, at least in may be perceivable as a visible artifact, such as a mura.

To facilitate compensating for display pixel non-uniformity, in some embodiments, the sub-pixel uniformity compensation (SPUC) block 48 may apply (e.g., voltage) offset values to image data corresponding to one or more display pixels. Additionally, in some embodiments, the offset values to be applied to image data may be indicated via an offset map, which may be stored in the external memory 38. Furthermore, in some embodiments, a sub-sampled (e.g., down-sampled) version may be stored in external memory 38 (e.g., to facilitate reducing storage consumption) and, thus, the sub-pixel uniformity compensation (SPUC) block 48 may sub-sample (e.g., up-sample) the offset map before application to the image data. In any case, in such embodiments, the direct memory access (DMA) block 46 may retrieve offset map data from the external memory 38 into the display pipeline 36, for example, based on a request identifying the offset map data received from the sub-pixel uniformity compensation (SPUC) block 48.

Additionally, in some embodiments, the burn-in compensation (BIC) block 50 may process image data to compensate for display pixel burn-in, which may occur due to display pixel aging. For example, as display pixels age, burn-in may occur in an LCD display due to one or more of its display pixels losing ability to return to a relaxed state. Additionally or alternatively, as its display pixels age, burn-in may occur in an OLED display due to red-green-blue (RGB) degradation. Thus, at least in some instances, display pixel burn-in may affect actual (e.g., perceived) luminance of a display pixel. In fact, display pixel burn-in may result in the actual luminance of the display pixel differing from its target luminance indicated by corresponding image data, which, at least in may be perceivable as a visible artifact, such as a mura.

To facilitate compensating for display pixel non-uniformity, in some embodiments, the burn-in compensation (BIC) block 50 may apply gain values to image data corresponding to one or more display pixels. Additionally, in some embodiments, the gain values to be applied to image data may be indicated via a gain map, which may be stored in the external memory 38. Furthermore, in some embodiments, a sub-sampled (e.g., down-sampled) version may be stored in external memory 38 (e.g., to facilitate reducing storage consumption) and, thus, the burn-in compensation (BIC) block 50 may sub-sample (e.g., up-sample) the gain map before application to the image data. In any case, in such embodiments, the direct memory access (DMA) block 46 may retrieve gain map data from the external memory 38 into the display pipeline 36, for example, based on a request identifying the gain map data received from the burn-in compensation (BIC) block 50.

In some embodiments, the gain values to be applied may be determined based at least in part on luminance history of the display pixels, which may be updated based at least in part on statistics determined by the burn-in statistics (BIS) block 52. For example, the burn-in statistics (BIS) block 52 may determine statistics based on analysis of image data included within an active region in one or more images. In some embodiments, the processor core complex 18 and/or other image processing circuitry 27 may update the luminance history based at least in part on the statistics (e.g., along with temperature history of the display pixels) and determine the gain values to be subsequently applied based at least in part on the updated luminance history.

The image data processing blocks 58 (e.g., SPUC, BIC, BIS) may together provide valuable information on operational behavior of the electronic display 12 and may process the image data to account for the operational behavior of the electronic display 12. It should be appreciated that the image data processing block(s) 58 may include additional process blocks such as ambient adaptive pixel (AAP) block, a dynamic pixel backlight (DPB) block, a white point correction (WPC) block, a sub-pixel layout compensation (SPLC) block, a panel response correction (PRC) block, a dithering block, an image signal processor (ISP) block, a content frame dependent duration (CDFD) block, an ambient light sensing (ALS) block, or any combination thereof. Future references to image data processing block(s) 58 may include image processing blocks, such as those described and mentioned above, other processing blocks that may use a portion of the total memory bandwidth, and/or real-time streams that may have a guaranteed memory bandwidth.

The display pipeline 36 may further include internal memory that may be used as, for example, an output buffer 54. The output buffer 54 may temporarily store image data processed by from the image data processing block(s) 58 prior to another system component (e.g., display panel 56) retrieving the image data, for example, for display of a corresponding image on an electronic display 12. The output buffer 54, by acting as a reservoir for image data, may reduce likelihood of perceivable lag when displaying new image content on the electronic display 12 when requested by the display panel 56.

However, when the display pipeline 36 and/or image data processing block(s) 58 are allocated inadequate amounts of the total memory bandwidth (e.g., allocated less memory bandwidth than indicated by the bandwidth floor), an underrun may occur. Total memory bandwidth may refer to the rate at which data stored in memory may be fetched (e.g., read) or stored (e.g., written) by a system using a memory bus per DMA cycle. Generally, the total memory bandwidth may be fixed for accessing (i.e., fetching and storing) memory. Thus, portions of the total memory bandwidth may be allocated to the display pipeline 36 and/or to each image data processing block 58. It should be noted that providing less memory bandwidth than the bandwidth floor may not always result in an underrun the bandwidth floor is determined based on a worst-case scenario for compression and buffer alignment.

However, when the image data is stored in, for example, a linear memory format and/or has YCbCR color format, the allocated amount of total memory bandwidth to the display pipeline 36 and/or to each image data processing block 58 may be insufficient to adequately fetch the image from memory. Similarly, when the image data processing block(s) 58 are real-time clients, their access to memory may increase or decrease based on, for example, image content and/or environmental conditions. The minimum amount of memory bandwidth for each image data processing block 58 to adequately function (e.g., fetch image data from memory) may vary, for example, based on the format of image data to be retrieved from memory. Allocating fixed portions of the total memory bandwidth may, therefore, result in communication inefficiency (e.g., an underrun) whereby the display process pauses, and/or power consumption inefficiency by the display pipeline 36 and/or image data processing block(s) 58 that may function adequately even when allotted less memory bandwidth. Thus, dynamic allocation of the total memory bandwidth to the display pipeline 36 components may preserve and/or improve communication efficiency and perceived image quality.

Figure 7:
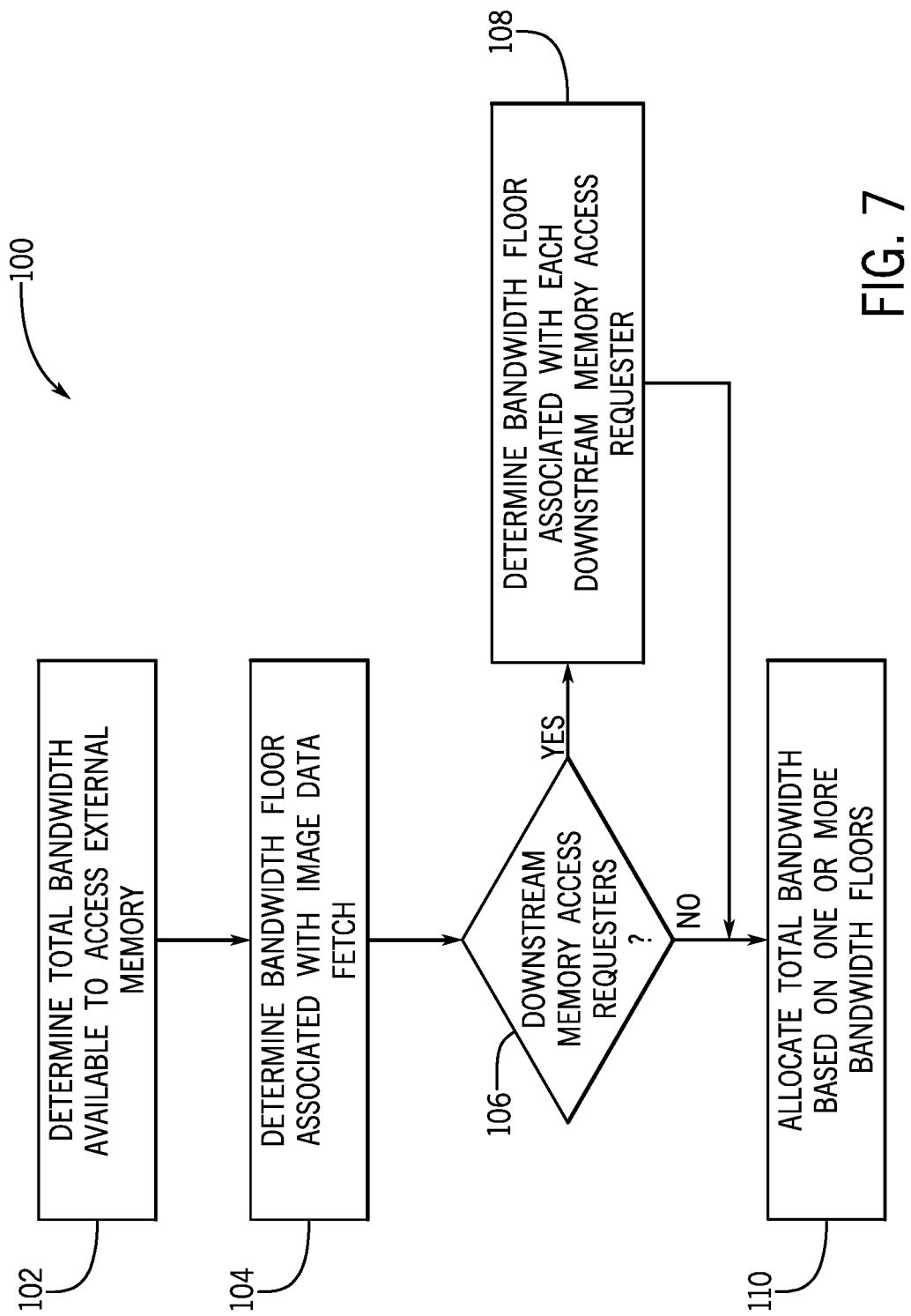
FIG. 7 is a flow diagram of a process for allocating total memory bandwidth between memory access requesters based on associated bandwidth floors, in accordance with an embodiment.

To help illustrate, a process 100 for dynamically (e.g., adaptively) allocating total memory bandwidth to memory access requesters is described in FIG. 7. Generally, the process 100 includes determining total memory bandwidth available to access external memory (process block 102), determining a bandwidth floor associated with image data fetch (process block 104), evaluating whether there are downstream memory access requesters (e.g., image data processing block(s) 58) (decision block 106), determining, if the downstream memory access requesters exist, a bandwidth floor associated with each downstream memory access requester (process block 108), and allocating the total memory bandwidth based on one or more bandwidth floors (process block 110). While the process 100 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 100 may be implemented at least in part by that processor core complex 18 that executes instructions stored in a tangible, non-transitory, computer-readable medium, such as the controller memory 44. In alternative or additional embodiments, at least some steps of the process 100 may be implemented by any other suitable components or control logic, such as another electronic device, and the like.

Thus, in some embodiments, a controller 40 (e.g., pipeline controller 40 and/or supervisory controller 40) may determine the total bandwidth available to access external memory (process block 102). In some embodiments, the total memory bandwidth available may be determined based on operational parameters of the one or more memory buses and/or the memory 38 size. Additionally or alternatively, the total memory bandwidth may be predetermined and stored in the electronic device 10. Furthermore, in some embodiments, the total memory bandwidth available for the display pipeline 36 may exclude memory bandwidth already in use by real-time clients and/or other processing systems of the electronic device 10.

Additionally, the controller 40 may determine the bandwidth floor associated with fetching image data (process block 104). In some embodiments, the pipeline controller 40 may determine an image data fetch bandwidth floor and indicate the image data fetch bandwidth floor to the supervisory controller 40, for example, via communication signals. Additionally or alternatively, the supervisory controller 40 may itself determine the image data fetch bandwidth floor. In some embodiments, the bandwidth floor associated with the fetch block 59 may be the smallest read or write bandwidth expected to be sufficient for the fetch block 59 to avoid underrunning the display pipeline 36.

Figure 8:
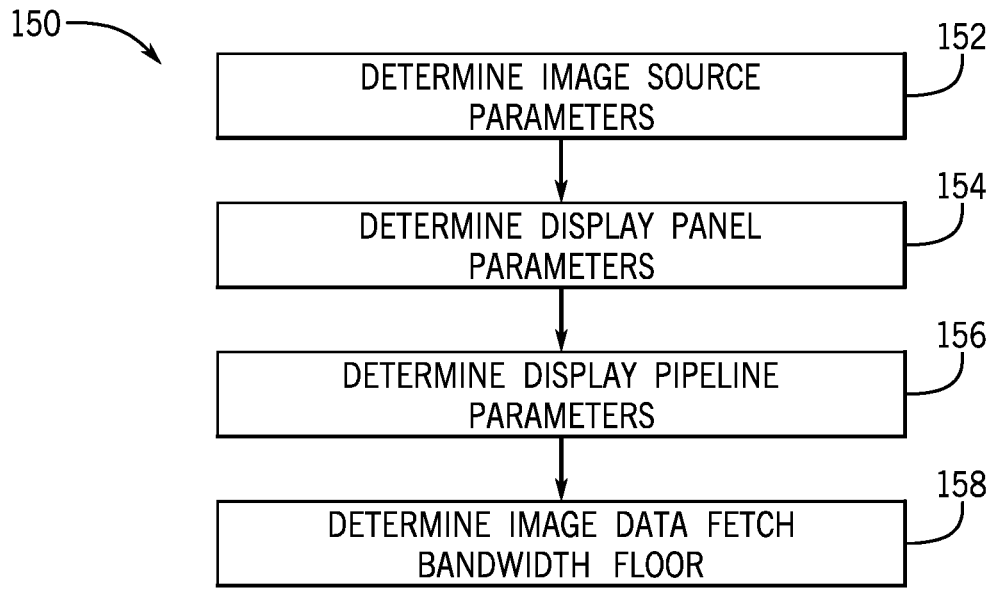
FIG. 8 is a flow diagram of a process for determining an image data fetch bandwidth floor, in accordance with an embodiment.

In any case, an example of a process 150 for determining an image data fetch bandwidth is described in FIG. 8. Generally, the process 150 includes determining image source parameters (process block 152), determining display panel parameters (process block 154), determining display pipeline parameters (process block 156), and determining a bandwidth floor associated with fetching image data (process block 158). In some embodiments, at least some of the steps of the process 150 may be implemented at least in part by a processor core complex 18 that executes instructions stored in a tangible, non-transitory, computer-readable medium, such as the memory 44. In alternative or additional embodiments, at least some steps of the process 150 may be implemented by any other suitable components or control logic, such as another electronic device, and the like. Further, while the process 150 is described using steps in a specific sequence, it should be understood that the present disclosure contemplates that the described steps may be performed in different sequences than the sequence illustrated, and certain described steps may be skipped or not performed altogether.

Accordingly, in some embodiments, a controller 40 (e.g., pipeline controller 40) may determine image source parameters, for example, which may be indicative of amount of source image data corresponding with an image to be displayed (process block 152). In some embodiments, the image source parameters may indicate a source pixel (e.g., color) format used by source image data stored in the external memory 38 to indicate target luminance, a source memory (e.g., addressing) format used to organize storage of source image data corresponding with a source image in the external memory 38, and/or size (e.g., number of bits or bytes) of source image data per image pixel in the source image, which may be determined based at least in part on the source pixel format and/or the source memory format. For example, the image source parameters may indicate whether the source color format is a red-green-blue (RGB) color format, an alpha-red-green blue (aRGB) color format, a luma-blue chroma-red chroma (YCbCr) color format, or the like. Additionally, the image source parameters may indicate number of bits used to indicate each color component in the source color format, number of planes (e.g., continuous memory addresses, source space) used to store the source image, width (e.g., number of image pixel columns) of the source image, and/or height (e.g., number of image pixel rows) of the source image.

Moreover, in some embodiments, subdividing an image through tile rendering may facilitate reducing the amount of memory used to store and, thus, memory bandwidth used transmit the image data, for example, compared to transmitting the entire image data at once. As such, the image source parameters may additionally indicate whether the source image is stored linearly (e.g., per image pixel basis) or as tiles (e.g., group of image pixels). When they indicate that the source memory format is a linear memory format, the image source parameters may also indicate whether the source image data is pixel packed and/or number of source image data components packed into each (e.g., 32-bit or 4-byte) data word. Additionally or alternatively, when they indicate that the source memory format is a tiled memory format, the image source parameters may also indicate whether the source image is stored as N×N (e.g., 8×8) graphics tile (e.g., output from GPU), 2N×N (e.g., 16×8) media tiles (e.g., output from an image sensor), N×2N (e.g., rotated) media tiles, or the like.

Additionally, the controller 40 may determine display panel (e.g., destination) parameters, for example, which may be indicative refresh duration implemented by the display panel 56 to write an image (process block 154). In some embodiments, the display panel parameters may indicate width (e.g., number of display pixel columns) of the display panel 56, height (e.g., number of display pixel rows) of the display panel 56, and/or line time (e.g., duration each display pixel row is scanned or written) implemented by the display panel 56. The electronic display 12 may affect how much and the rate at which image data may be transmitted to the electronic display 12. For example, if the display 12 size (e.g., number of display pixel rows) is large, the display 12 may display more image data and the electronic device 10 may thus use a larger bandwidth to transmit the image data to the display 12. Similarly, to write more image data in the same period of time, display line-time (e.g., duration for writing a row of display pixels) may utilize more bandwidth.

Furthermore, the controller 40 may determine display pipeline parameters, for example, which may be indicative of expected processing duration of the display pipeline 36 (process block 156). In some embodiments, the display pipeline parameters may indicate a specific pipeline configuration to be implemented while processing an image, for example, by indicating which image data processing blocks are bypassed and/or which image data processing blocks are enabled. Additionally or alternatively, the display pipeline parameters may assume a worst-case scenario, for example, in which each image data processing block is enabled to facilitate further reducing likelihood of producing an underrun condition.

Based on the various parameters, the controller 40 may determine the image data fetch bandwidth floor, for example, associated with the fetch block 59 (process block 158). When the image source parameters indicate that the source image data is stored using multiple planes, an image data fetch bandwidth floor may be determined on a per plane basis and, thus, summed to determine a total image data fetch bandwidth floor. Additionally, in some embodiments, an image data fetch bandwidth floor may generally be determined based at least in part on a pessimistic (e.g., overestimated) prediction of size of source image data corresponding with an image to be displayed and refresh duration implemented by the display panel 56 to write the image, for example, by dividing the pessimistic prediction of the source image size by the refresh duration and rounding up to a multiple of 100 MB/s.

In some embodiments, the refresh duration to be implemented by the display panel 56 may be determined based at least in part on the display panel parameters. For example, the controller 40 may determine the refresh duration by multiplying the height of the display panel 56 and line time of the display panel 56. As such, in some embodiments, the refresh duration of the display panel 56 may be fixed, for example, due to the display panel 56 controlling refresh rate by adjusting duration of blanking (e.g., Vblank) periods between successive refresh periods.

On the other hand, in some embodiments, the pessimistic prediction of source image data size may vary based at least in part on the image source parameters. For example, when the image source parameters indicate that source memory format is linear, the pessimistic prediction of source image data size may be determined by multiplying value (e.g., 128) of a target byte alignment, a pessimistic (e.g., overestimated) prediction of number target byte alignment fetches to be used to retrieve source image data size corresponding with an image pixel row, and height of the source image. In some embodiments, the pessimistic prediction of the number of target byte alignment fetches may be determine by multiplying width of the source image with source image data size per image pixel, dividing by value of the target byte alignment, rounding up (e.g., to nearest integer), and adding a bias value (e.g., one). Additionally, when the image source parameters indicate that source memory format is packed, the source image width may be divided by number of color components packed into each data word (e.g., 32 bytes), rounded up (e.g., to nearest integer), and multiplied by the number of color components packed into each data word.

On the other hand, when the image source parameters indicate that source memory format is tiled, the pessimistic prediction of source image data size may be determined by multiplying a pessimistic (e.g., overestimated) prediction of number of tiles in the source image with the size of source image data corresponding with the pixel tiles. In some embodiments, the pessimistic prediction of number of tiles may be determined by multiplying a pessimistic prediction of number of tiles in the source image along a first direction with a pessimistic prediction of number of tiles in the source image along a second direction (e.g., orthogonal to the first direction). For example, the controller 40 may determine a pessimistic prediction of number of tiles in the source image along a direction by dividing a dimension (e.g., width or height) of the source image by a corresponding dimension of the pixel tiles, rounding up (e.g., to nearest integer), and adding a bias value (e.g., one). Additionally, in some embodiments, the controller 40 may determine size of source image data corresponding with each pixel tile by multiplying source image data size per image pixel with the number of image pixels in a pixel tile and adding size of overhead data associated with each pixel tile. In this manner, a controller 40 (e.g., pipeline controller 40) may determine an image data fetch bandwidth floor.

Returning to process 100 of FIG. 7, the controller 40 (e.g., pipeline controller 40) may determine whether any memory access requester blocks 58 implemented downstream relative to the fetch block 59 are enabled (decision block 106). Upon determination that such blocks 58 exist in the display pipeline 36, the controller 40 may determine a bandwidth floor associated with each downstream memory access requester block 58 (process block 108). In some embodiments, the bandwidth floor associated with an image data processing block 58 may be the smallest read or write bandwidth expected to be sufficient for image data processing block 58 to avoid underrunning the display pipeline 36.

Figure 9:
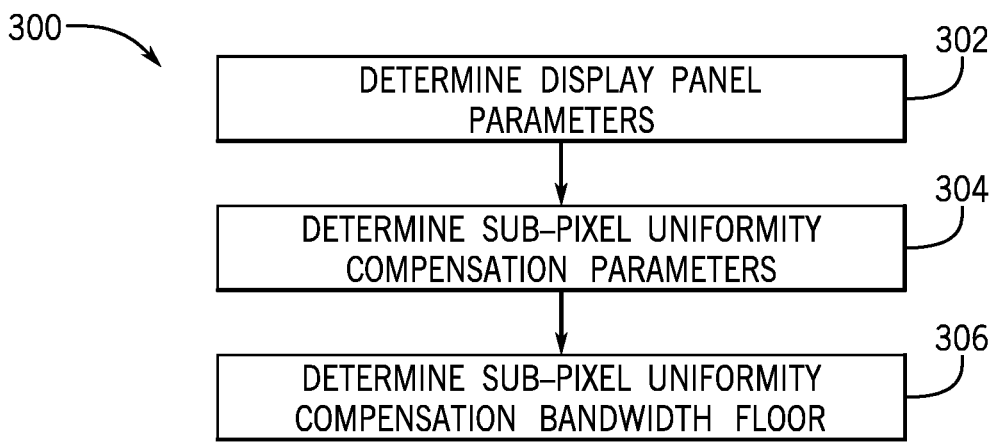
FIG. 9 is a flow diagram of a process for determining a sub-pixel uniformity compensation bandwidth floor, in accordance with an embodiment.

To help illustrate, an example of a process 300 for determining a bandwidth floor associated with a sub-pixel uniformity compensation (SPUC) block 48, which may be a memory access requester block, is described in FIG. 9. Generally, the process 300 includes determining display panel parameters (process block 302), determining sub-pixel uniformity compensation parameters (process block 304), and determining a sub-pixel uniformity compensation bandwidth floor (process block 306). In some embodiments, at least some of the steps of the process 300 may be implemented at least in part by a processor core complex 18 that executes instructions stored in a tangible, non-transitory, computer-readable medium, such as the memory 44. In alternative or additional embodiments, at least some steps of the process 300 may be implemented by any other suitable components or control logic, such as another electronic device, and the like. While the process 300 is described using steps in a specific sequence, it should be understood that the present disclosure contemplates that the described steps may be performed in different sequences than the sequence illustrated, and certain described steps may be skipped or not performed altogether.

Accordingly, in some embodiments, a controller 40 (e.g., pipeline controller 40) may determine display panel parameters (process block 302). As described above, in some embodiments, the display panel parameters may indicate width (e.g., number of display pixel columns) of the display panel 56, height (e.g., number of display pixel rows) of the display panel 56, and/or line time (e.g., duration each display pixel row is scanned or written) implemented by the display panel 56.

Additionally, the controller 40 may determine sub-pixel uniformity compensation parameters to be implemented by the sub-pixel uniformity compensation (SPUC) block 48 (process block 304). As described above, when enabled, the sub-pixel uniformity compensation (SPUC) block 48 may apply offset values to image data to compensate for non-uniformity between display pixels. Additionally, as described, the offset value to be applied may be stored as an offset map, which may be sub-sampled to reduce storage space. Thus, in some embodiments, the sub-pixel uniformity compensation parameters may indicate whether the sub-pixel uniformity compensation parameters block 48 is enabled, one or more sub-sampling ratios applied to the offset map, and/or size (e.g., number of bits or byte) of offset map data per pixel.

Based at least in part on the display panel parameters and the sub-pixel uniformity compensation parameters, the controller 40 may determine a bandwidth floor associated with the sub-pixel uniformity compensation (SPUC) block 48 (process block 306). In some embodiments, a bandwidth floor associated with the sub-pixel uniformity compensation (SPUC) block 48 may be determined based at least in part on a pessimistic (e.g., overestimated) prediction of size of the offset map data to be applied to an image and refresh duration implemented by the display panel 56 to write the image, for example, by dividing the pessimistic prediction of the offset map data size by the refresh duration and rounding up to a multiple of 100 MB/s.

In some embodiments, the refresh duration to be implemented by the display panel 56 may be determined based at least in part on the display panel parameters. For example, the controller 40 may determine the refresh duration by multiplying the height of the display panel 56 and line time of the display panel 56. Additionally, in some embodiments, the pessimistic prediction of the offset map data size may be determined by multiplying number of display pixels implemented on the display panel 56 with size of offset map data per pixel, adding a bias value (e.g., based on width and/or height of display panel 56), and dividing by one or more sub-sampling ratios (e.g., x-direction down-sampling ratio and/or y-direction down-sampling ratio) applied to the offset map data.

In some embodiments, the controller 40 may actively determine (e.g., calculate) the sub-pixel uniformity compensation bandwidth floor. Additionally or alternatively, when the sub-pixel uniformity compensation (SPUC) block 48 is enabled, the sub-pixel uniformity compensation parameters as well as the display panel parameters may be fixed. Thus, in such embodiments, the sub-pixel uniformity compensation bandwidth floor may be predetermined and stored, for example, by a manufacturer in a tangible, non-transitory, computer-readable medium, such as the controller memory 44. As such, the controller 40 may determine the sub-pixel uniformity compensation bandwidth floor by retrieving the sub-pixel uniformity compensation bandwidth floor from the tangible, non-transitory, computer-readable medium.

Figure 10:
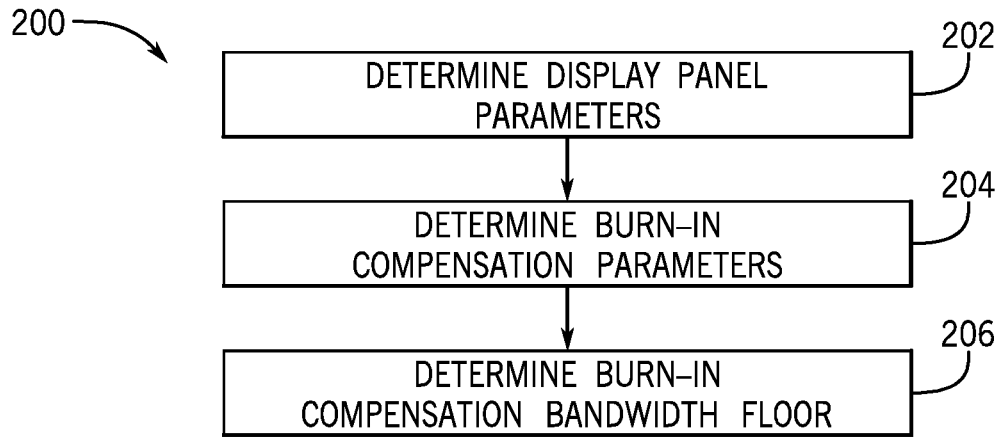
FIG. 10 is a flow diagram of a process for determining a burn-in compensation bandwidth floor, in accordance with an embodiment.

To help further illustrate, an example of a process 200 for determining a bandwidth floor associated with a burn-in compensation (BIC) block 50, which may be a memory access requester block, is described in FIG. 10. Generally, the process 200 includes determining display panel parameters (process block 202), determining burn-in compensation parameters (process block 204), and determining a burn-in compensation bandwidth floor (process block 206). In some embodiments, at least some of the steps of the process 200 may be implemented at least in part by a processor core complex 18 that executes instructions stored in a tangible, non-transitory, computer-readable medium, such as the memory 44. In alternative or additional embodiments, at least some steps of the process 200 may be implemented by any other suitable components or control logic, such as another electronic device, and the like. While the process 200 is described using steps in a specific sequence, it should be understood that the present disclosure contemplates that the described steps may be performed in different sequences than the sequence illustrated, and certain described steps may be skipped or not performed altogether.

Accordingly, in some embodiments, a controller 40 (e.g., pipeline controller 40) may determine display panel parameters (process block 202). As described above, in some embodiments, the display panel parameters may indicate width (e.g., number of display pixel columns) of the display panel 56, height (e.g., number of display pixel rows) of the display panel 56, and/or line time (e.g., duration each display pixel row is scanned or written) implemented by the display panel 56.

Additionally, the controller 40 may determine burn-in compensation parameters to be implemented by the burn-in compensation (BIC) block 50 (process block 204). As described above, when enabled, the burn-in compensation (BIC) block 50 may apply gain values to image data to compensate for pixel burn-in, for example, resulting from display pixel aging. Additionally, as described, the gain value to be applied may be stored as a gain map, which may be sub-sampled to reduce storage space. Thus, in some embodiments, the burn-in compensation parameters may indicate whether the burn-in compensation (BIC) block 50 is enabled, one or more sub-sampling ratios applied to the gain map, and/or size of gain map data per pixel.

Based at least in part on the display panel parameters and the burn-in compensation parameters, the controller 40 may determine a bandwidth floor associated with the burn-in compensation (BIC) block 50 (process block 206). In some embodiments, a bandwidth floor associated with the burn-in compensation (BIC) block 50 may be determined based at least in part on a pessimistic (e.g., overestimated) prediction of size of the gain map data to be applied to an image and refresh duration implemented by the display panel 56 to write the image, for example, by dividing the pessimistic prediction of the gain map data size by the refresh duration and rounding up to a multiple of 100 MB/s.

In some embodiments, the refresh duration to be implemented by the display panel 56 may be determined based at least in part on the display panel parameters. For example, the controller 40 may determine the refresh duration by multiplying the height of the display panel 56 and line time of the display panel 56. Additionally, in some embodiments, the pessimistic prediction of the gain map data size may be determined by multiplying number of display pixels implemented on the display panel 56 with size of gain map data per pixel, adding a bias value (e.g., based on width and/or height of display panel 56), and dividing by one or more sub-sampling ratios (e.g., x-direction down-sampling ratio and/or y-direction down-sampling ratio) applied to the gain map data.

In some embodiments, the controller 40 may actively determine (e.g., calculate) the burn-in compensation bandwidth floor. Additionally or alternatively, when the burn-in compensation (BIC) block 50 is enabled, the burn-in compensation parameters as well as the display panel parameters may be fixed. Thus, in such embodiments, the burn-in compensation bandwidth floor may be predetermined and stored, for example, by a manufacturer in a tangible, non-transitory, computer-readable medium, such as the controller memory 44. As such, the controller 40 may determine burn-in compensation bandwidth floor by retrieving the burn-in compensation bandwidth floor from the tangible, non-transitory, computer-readable medium.

Figure 11:
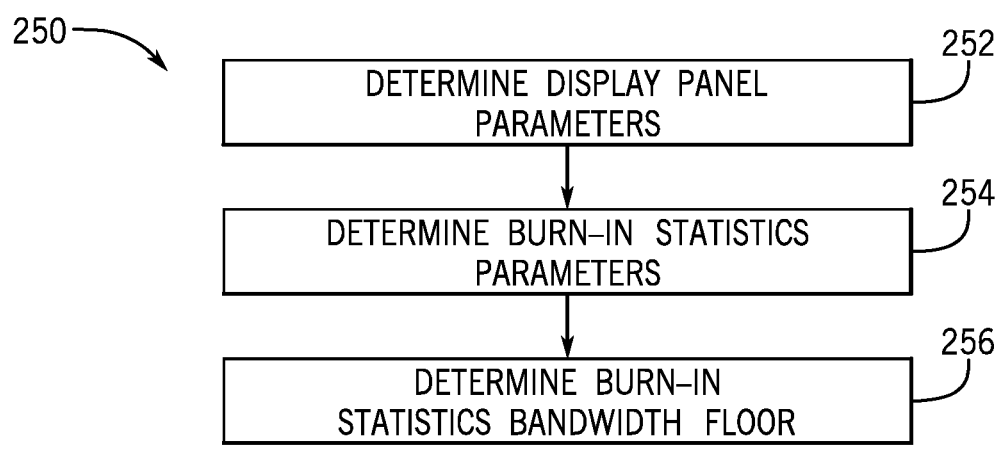
FIG. 11 is a flow diagram of a process for determining a burn-in statistics bandwidth floor, in accordance with an embodiment.

To help further illustrate, an example of a process 250 for determining the bandwidth floor associated with a burn-in statistics (BIS) block 52, which may be a memory access requester, is described in FIG. 11. Generally, the process 250 includes determining display panel parameters (process block 252), determining burn-in statistics parameters (process block 254), and determining a burn-in statistics bandwidth floor (process block 256). In some embodiments, at least some of the steps of the process 250 may be implemented at least in part by a processor core complex 18 that executes instructions stored in a tangible, non-transitory, computer-readable medium, such as the memory 44. In alternative or additional embodiments, at least some steps of the process 250 may be implemented by any other suitable components or control logic, such as another electronic device, and the like. While the process 250 is described using steps in a specific sequence, it should be understood that the present disclosure contemplates that the described steps may be performed in different sequences than the sequence illustrated, and certain described steps may be skipped or not performed altogether.

Accordingly, in some embodiments, a controller 40 (e.g., pipeline controller 40) may determine display panel parameters (process block 252). As described above, in some embodiments, the display panel parameters may indicate width (e.g., number of display pixel columns) of the display panel 56, height (e.g., number of display pixel rows) of the display panel 56, and/or line time (e.g., duration each display pixel row is scanned or written) implemented by the display panel 56.

Additionally, the controller 40 may determine burn-in statistics parameters to be implemented by the burn-in statistics (BIS) block 52 (process block 254). As described above, when enabled, the burn-in statistics (BIS) block 52 may analyze an active region in one or more images to determine luminance statistics data, which may written back to the external memory 38 and used to determine the gain map data to be applied by the burn-in compensation (BIC) block 50. Thus, in some embodiments, the burn-in statistics parameters may indicate whether the burn-in statistics (BIS) block 52 is enabled, one or more pixel dimensions (e.g., width and/or height) of an analyzed active region, and/or size (e.g., number of bits or byte) of luminance update statistics per pixel.

Based at least in part on the display panel parameters and the sub-pixel uniformity compensation parameters, the controller 40 may determine a bandwidth floor associated with burn-in statistics (BIS) block 52 (process block 256). In some embodiments, a bandwidth floor associated with the burn-in statistics (BIS) block 52 may be determined based at least in part on a pessimistic (e.g., overestimated) prediction of size of the luminance statistics data determined by analyzing active region in an image and refresh duration implemented by the display panel 56 to write the image, for example, by dividing the pessimistic prediction of the luminance statistics data size by the refresh duration and rounding up to a multiple of 100 MB/s.

In some embodiments, the refresh duration to be implemented by the display panel 56 may be determined based at least in part on the display panel parameters. For example, the controller 40 may determine the refresh duration by multiplying the height of the display panel 56 and line time of the display panel 56. Additionally, in some embodiments, the pessimistic prediction of the luminance statistics data may be determined by multiplying number of image pixels in the active region with size of luminance statistics data and adding a bias value (e.g., based on width and/or height of the active region). In this manner, a controller 40 (e.g., pipeline controller 40) may determine a burn-in statistics bandwidth floor.

Returning to process 100 of FIG. 7, upon determination of bandwidth floors for each memory access requester block 58 or upon determination that no memory access requester blocks 58 exist downstream in the display pipeline 36, the total bandwidth may be allocated based at least in part on the bandwidth floor determined for each memory access requester block 58. When memory access requester blocks 58 exist downstream in the display pipeline, each block 58 may be allocated memory bandwidth that is at least equal to the bandwidth floor calculated for each block 58 as well as the display pipeline 36 as a whole based on the image fetch bandwidth floor. When it is determined that no memory access requester blocks 58 exist downstream, the total bandwidth may be allocated to the display pipeline as a whole.

Figure 12:
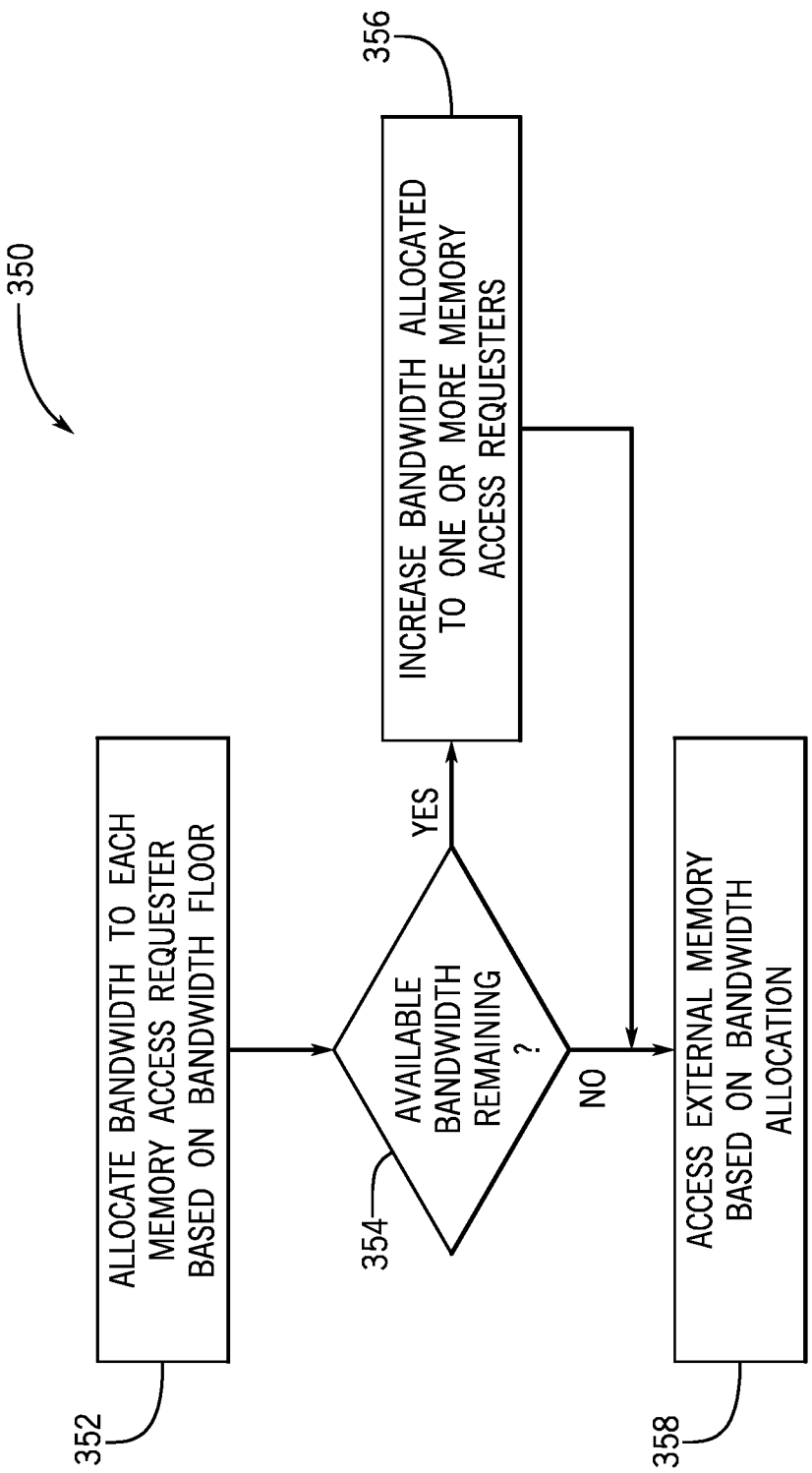
FIG. 12 is a flow diagram of a process for adjusting allocation of the total memory bandwidth between the memory access requesters, in accordance with an embodiment.

To help illustrate, an example of a process 350 for allocating access total memory bandwidth to one or more memory access requesters is described in FIG. 12. Generally, the process 350 includes allocating bandwidth to each memory access requester based at least in part on an associated bandwidth floor (process block 352), determining whether there is available memory bandwidth remaining (decision block 354), increasing bandwidth allocated to one or more memory access requesters when there is available memory bandwidth (process block 356), and accessing external memory 38 based on the bandwidth allocation (process block 358). In some embodiments, at least some of the steps of the process 350 may be implemented at least in part by a processor core complex 18 that executes instructions stored in a tangible, non-transitory, computer-readable medium, such as the memory 44. In alternative or additional embodiments, at least some steps of the process 350 may be implemented by any other suitable components or control logic, such as another electronic device, and the like. While the process 350 is described using steps in a specific sequence, it should be understood that the present disclosure contemplates that the described steps may be performed in different sequences than the sequence illustrated, and certain described steps may be skipped or not performed altogether.

Accordingly, in some embodiments, a controller 40 (e.g., supervisory controller 40) determine allocation of total memory bandwidth between various memory access requesters (e.g., display pipeline 36 as a whole and/or a block 58 in the display pipeline 36) based at least in part on associated the bandwidth floors. In some embodiments, the controller 40 may initially allocate memory access bandwidth such that each memory access requester is allocated at least a portion of the total memory access bandwidth equal to its bandwidth floor.

After the initial allocation, the controller 40 may determine whether there is available memory bandwidth remaining for allocation (process block 354). When access memory bandwidth remains, the controller 40 may opportunistically adjust allocation of memory access bandwidth (process block 356). In some embodiments, the controller 40 may adjust allocation of memory access bandwidth to facilitate reducing the likelihood of an underrun condition subsequently occurring, for example, by prioritizing one or more of the memory access requesters. For example, the controller 40 may prioritize image data fetch and, thus, increase memory access bandwidth allocated for fetching image data above the image data fetch bandwidth floor.

In some instances, the combined bandwidth floor of the memory access requesters may be greater than the total memory access bandwidth implemented in the electronic device 10. Since the display sub-system (e.g., electronic display 12 and display pipeline 36) is generally the most user facing portion of an electronic device 10, in some embodiments, the controller 40 may prioritize the memory access bandwidth floors associated with memory access requesters implemented in the display sub-system over the memory access bandwidth floors associated with memory access requesters implemented in other sub-systems. For example, the controller 40 may allocate the total memory access bandwidth such that each memory access requesters implemented in the display sub-system is nevertheless allocated at least its memory access bandwidth floor while memory access bandwidth allocated to one or more memory access requesters implemented in other sub-systems may be reduced below associated memory access bandwidth floors.

In any case, after the memory access bandwidth is allocated, the controller 40 may indicate the allocated memory access bandwidth to enable the various memory access requesters to access the external memory 38 using its allocated memory access bandwidth (process block 358). For example, the controller 40 may instruct the direct memory access (DMA) block 46 to fetch source image data for the fetch block 59 using a first memory access bandwidth, fetch offset map data for the sub-pixel uniformity compensation (SPUC) block 48 using a second memory access bandwidth, fetch gain map data for the burn-in compensation (BIC) block 50 using a third memory access bandwidth, and/or store luminance statistics data determined by the burn-in statistics (BIS) block 52 using a third memory access bandwidth. Additionally or alternatively, the controller 40 may instruct the direct memory access block 46 to fetch source image data, fetch offset map data, fetch gain map data, and/or store luminance statistics data using a combined memory access bandwidth (e.g., sum of first memory access bandwidth, second memory access bandwidth, third memory access bandwidth, and fourth memory access bandwidth).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   a display panel configured to display an image based at least in part on display image data;
   an external memory configured to store source image data corresponding with the image;
   a display pipeline coupled between the external memory and the display panel, wherein the display pipeline comprises:
      a first image data processing block programmed to perform a first operation on image data corresponding with the image to facilitate generating the display image data;
      a direct memory access block coupled between the external memory and the first image data processing block; and
   a controller coupled to the direct memory access block, wherein the controller is programmed to:
      determine parameters of the display panel and parameters of the source image data;
      determine total memory access bandwidth provided by the electronic device to access the external memory;
      determine an image data bandwidth floor associated with fetching the source image data from the external memory based at least in part on the parameters of the display panel and the parameters of the source image data;
      determine one or more other bandwidth floors each associated with a memory access requester implemented in the electronic device that requests access to the external memory, wherein the one or more other bandwidth floors comprise a minimum amount of memory bandwidth that is configured to prevent an underrun condition;
      allocate a first memory access bandwidth to be used by the direct memory access block to fetch the source image data from the total memory access bandwidth provided by the electronic device such that the first memory access bandwidth is greater than the image data bandwidth floor when a sum of the image data bandwidth floor and the one or more other bandwidth floors is less than the total memory access bandwidth; and
      instruct the direct memory access block to fetch the source image data from the external memory using the first memory access bandwidth allocated to the direct memory access block based at least in part on the image data bandwidth floor to facilitate generating the display image data before the display image data is requested by the display panel.

2. The electronic device of claim 1, wherein:
the parameters of the source image data comprise a source format used by the source image data to indicate target luminance in the image, a memory format used to store the source image data in the external memory, dimensions of the image in a source space, or any combination thereof;
the parameters of the display panel comprise number of display pixel lines implemented in the display panel, line time allocated to the display panel to write a display pixel line, or both, and
wherein the image data bandwidth floor is a minimum amount of memory bandwidth provided to the display pipeline that is configured to prevent an underrun condition.

3. The electronic device of claim 1, wherein the controller is programmed to receive the image data bandwidth floor associated with fetching the source image data from the external memory from the display pipeline.

4. The electronic device of claim 1, wherein the controller is programmed to allocate the first memory access bandwidth to be used by the direct memory access block to fetch the source image data from the total memory access bandwidth provided by the electronic device such that the first memory access bandwidth is equal to the image data bandwidth floor when the sum of the image data bandwidth floor and the one or more other bandwidth floors is less than the total memory access bandwidth.

5. The electronic device of claim 1, comprising:
a touch sensing system configured to detect a user input based at least in part on contact between an object and an outer facing surface of the display panel; and
an image source coupled to the touch sensing system, wherein the image source is configured to access the external memory using a second memory access bandwidth determined based at least in part on a corresponding bandwidth floor to store image content to be displayed via the display panel in the external memory when the user input is detected.

6. The electronic device of claim 1, comprising one or more sensors configured to measure environmental conditions of the electronic device, wherein:
the first image data processing block is programmed to perform the first operation on the image data corresponding with the image by applying first processing data to the image data when first environmental conditions are present and applying second processing data to the image data when second environmental conditions are present;
the external memory is configured to store the first processing data and the second processing data; and
the controller is programmed to instruct the direct memory access block to fetch the second processing data from the external memory using a second memory access bandwidth when a change from the first environmental conditions to the second environmental conditions is detected.

7. The electronic device of claim 1, wherein:
the external memory is configured to store first processing data;
the first image data processing block is programmed to perform the first operation by applying one or more values indicated by the first processing data to the image data corresponding with the image; and
the controller is programmed to:
determine parameters of the first image data processing block and parameters of the first processing data;
determine a processing data bandwidth floor associated with fetching the first processing data from the external memory based at least in part on the parameters of the first image data processing block, parameters of the first processing data, and the parameters of the display panel; and
instruct the direct memory access block to fetch the first processing data from the external memory using a second memory access bandwidth allocated to the direct memory access block based at least in part on the processing data bandwidth floor.

8. The electronic device of claim 7, wherein:
the first processing data comprises offset map data;
the first image data processing block comprises a sub-pixel uniformity compensation block programmed to:
sub-sample the offset map data to determine one or more offset values; and
perform the first operation by applying the one or more offset values to the image data corresponding with the image to facilitate offsetting manufacturing non-uniformity between display pixels implemented on the display panel;
the parameters of the first image data processing block comprise sub-sampling ratio applied by the first image data processing block; and
the parameters of the first processing data comprise size of the offset map data per image pixel in the image.

9. The electronic device of claim 7, wherein:
the display pipeline comprises a second image data processing block programmed to perform a second operation on the image data corresponding with the image to determine statistics data based at least in part on analysis of the image data; and
the controller is programmed to:
determine parameters of the second image data processing block and parameters of the statistics data;
determine a statistics data bandwidth floor associated with storing the statistics data into the external memory based at least in part on the parameters of the second image data processing block, parameters of the statistics data, and the parameters of the display panel; and
instruct the direct memory access block to store the statistics data into the external memory using a third memory access bandwidth allocated to the direct memory access block based at least in part on the statistics data bandwidth floor.

10. The electronic device of claim 9, wherein the controller is programmed to instruct the direct memory access block to fetch the source image data from the external memory using the first memory access bandwidth, fetch the first processing data from the external memory using the second memory access bandwidth, and store the statistics data into the external memory using the third memory access bandwidth during a direct memory access cycle.

11. The electronic device of claim 9, wherein:
the second image data processing block comprises a burn-in statistics block programmed to analyze an active region in the image to determine current luminance update statistics data;
the first processing data comprises gain map data determined based on previous luminance update statistics data determined by the second image data processing block based on analysis of a previous image;

the first image data processing block comprises a burn-in compensation block programmed to:
sub-sample the gain map data to determine one or more gain values; and
perform the first operation by applying the one or more gain values to the image data corresponding with the image to facilitate offsetting burn-in non-uniformity between display pixels implemented on the display panel;

the parameters of the first image data processing block comprise sub-sampling ratio applied by the first image data processing block;

the parameters of the first processing data comprise size of the gain map data per image pixel in the image;

the parameters of the second image data processing block comprise width of the active region analyzed by the second image data processing block; and the parameters of the statistics data comprise size of the statistics data per image pixel in the active region of the image.

12. A method for operating a display pipeline implemented in an electronic device, comprising:

determining, using a controller implemented in the electronic device, parameters of a display panel to be used to display an image based at least in part on display image data output from the display pipeline;

determining, using the controller, parameters of source image data to be fetched from external memory and processed by the display pipeline to produce the display image data;

determining, using the controller, an image data bandwidth floor associated with fetching the source image data from the external memory based at least in part on the parameters of the display panel and the parameters of the source image data;

determining, using the controller, a processing data bandwidth floor associated with fetching processing data to be applied by image data processing circuitry implemented in the display pipeline on the source image data;

determining, using the controller, total memory access bandwidth implemented in the electronic device;

determining, using the controller, a combined bandwidth floor based at least in part on a sum of the image data bandwidth floor and the processing data bandwidth floor;

determining, using the controller, a first memory access bandwidth to be used to fetch the source image data such that the first memory access bandwidth is greater than the image data bandwidth floor when the combined bandwidth floor is less than the total memory access bandwidth; and instructing, using the controller, the display pipeline to fetch the source image data using the first memory access bandwidth allocated to the display pipeline based at least in part on the image data bandwidth floor.

13. The method of claim 12, wherein:

determining the parameters of the source image data comprises determining a source color format used by the source image data to indicate target luminance in the image, a source memory format used to organize storage of the source image data in the external memory, dimensions of a source image corresponding with the source image data, or any combination thereof; and determining the parameters of the display panel comprises determining number of display pixel lines implemented in the display panel, line time allocated to the display panel to write a display pixel line, or both.

14. The method of claim 12, comprising instructing, using the controller, the display pipeline to fetch the processing data using a second memory access bandwidth allocated to the display pipeline based at least in part on the processing data bandwidth floor during a same direct memory access cycle as the source image data.

15. The method of claim 12, wherein determining the processing data bandwidth floor comprises:

determining, using the controller, parameters of the image data processing circuitry implemented in the display pipeline, wherein the parameters of the image data processing circuitry comprise one or more sub-sampling ratios applied by the image data processing circuitry on the processing data before application; and determining, using the controller, the processing data bandwidth floor associated with fetching the processing data based at least in part on the parameters of the display panel and the parameters of the image data processing circuitry.

16. A tangible, non-transitory, computer-readable medium that stores instructions executable by one or more processor implemented in an electronic device, wherein the instructions comprise instructions to:

determine, using one or more processors, parameters of a display panel to be used to display an image based at least in part on display image data output from a display pipeline implemented in the electronic device;

determine, using the one or more processors, parameters of source image data to be fetched from external memory and processed by the display pipeline to produce the display image data;

determine, using the one or more processors, an image data bandwidth floor associated with fetching the source image data from the external memory based at least in part on the parameters of the display panel and the parameters of the source image data;

determine, using the one or more processors, a processing data bandwidth floor associated with fetching processing data to be applied by image data processing circuitry implemented in the display pipeline on the source image data;

determine, using the one or more processors, total memory access bandwidth implemented in the electronic device;

determine, using the one or more processors, a combined bandwidth floor based at least in part on a sum of the image data bandwidth floor and the processing data bandwidth floor; and determine, using the one or more processors, a first memory access bandwidth to be used to fetch the source image data such that the first memory access bandwidth is greater than the image data bandwidth floor when the combined bandwidth floor is less than the total memory access bandwidth; and instruct, using the one or more processors, the display pipeline to fetch the source image data using the first memory access bandwidth allocated to the display pipeline based at least in part on the image data bandwidth floor.

17. The tangible, non-transitory, computer-readable medium of claim 16, wherein:

the instructions to determine the parameters of the source image data comprise instructions to determine a source color format used by the source image data to indicate target luminance in the image, a source memory format used to organize storage of the source image data in the external memory, dimensions of a source image corresponding with the source image data, or any combination thereof; and the instructions to determine the parameters of the display panel comprise instructions to determine number of display pixel lines implemented in the display panel, line time allocated to the display panel to write a display pixel line, or both.

18. The tangible, non-transitory, computer-readable medium of claim 16, wherein the instructions comprise instructions to instruct, using the one or more processors, the display pipeline to fetch the processing data using a second memory access bandwidth allocated to the display pipeline based at least in part on the processing data bandwidth floor during a same direct memory access cycle as the source image data.

19. An electronic device comprising:
   a display pipeline coupled between an external memory storing image data and a display panel, wherein the display pipeline comprises:
      an image data processing circuitry configured to process the image data; and
   a controller, wherein the controller is programmed to:
      determine an image data bandwidth floor associated with fetching the image data from the external memory based at least in part on parameters of the display panel and parameters of image data;
      determine a processing data bandwidth floor associated with fetching processing data to be applied by the image data processing circuitry on the image data;
      determine a total memory access bandwidth implemented in the electronic device;
      determine a combined bandwidth floor based at least in part on a sum of the image data bandwidth floor and the processing data bandwidth floor;
      determine a memory access bandwidth to be used to fetch the image data such that the memory access bandwidth is greater than the image data bandwidth floor when the combined bandwidth floor is less than the total memory access bandwidth; and
      instruct the display pipeline to fetch the image data using the memory access bandwidth.

* * * * *